(12) United States Patent
Grunow et al.

(10) Patent No.: US 11,569,602 B2
(45) Date of Patent: Jan. 31, 2023

(54) FLEXIBLE INPUT OUTPUT MOUNTING FOR SOLDER JOINT STRESS REDUCTION

(71) Applicant: Dell Products L.P., Round Rock, TX (US)

(72) Inventors: David W. Grunow, Round Rock, TX (US); Michael Kotson, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 127 days.

(21) Appl. No.: 17/232,482

(22) Filed: Apr. 16, 2021

(65) Prior Publication Data
US 2022/0336983 A1   Oct. 20, 2022

(51) Int. Cl.
| | |
|---|---|
| *H01R 12/91* | (2011.01) |
| *H01R 12/70* | (2011.01) |
| *G06F 1/18* | (2006.01) |
| *H01R 12/72* | (2011.01) |

(52) U.S. Cl.
CPC ............. *H01R 12/91* (2013.01); *G06F 1/183* (2013.01); *H01R 12/707* (2013.01); *H01R 12/7047* (2013.01); *H01R 12/722* (2013.01)

(58) Field of Classification Search
CPC .. H01R 12/91; H01R 12/7047; H01R 12/707; H01R 12/722; H01R 12/724; H01R 12/725; H01R 12/727; H01R 12/728
See application file for complete search history.

(56) References Cited

U.S. PATENT DOCUMENTS

| | | | | |
|---|---|---|---|---|
| 5,035,641 | A * | 7/1991 | Van-Santbrink | H01R 12/716 439/329 |
| 5,319,523 | A * | 6/1994 | Ganthier | H05K 1/117 439/59 |
| 5,954,536 | A * | 9/1999 | Fuerst | H01R 12/79 439/496 |
| 6,994,577 | B2 * | 2/2006 | Margulis | H01R 13/74 439/247 |
| 7,883,369 | B1 * | 2/2011 | Sun | H05K 1/117 439/607.35 |
| 9,905,944 | B2 * | 2/2018 | Little | H01R 13/65918 |
| 10,811,795 | B2 * | 10/2020 | Roldan | H01R 13/6271 |
| 2002/0173202 | A1 * | 11/2002 | Okamoto | H05K 3/3405 439/607.04 |
| 2010/0167570 | A1 * | 7/2010 | Yang | H01R 12/7023 439/325 |
| 2017/0155216 | A1 * | 6/2017 | Yao | H01R 13/6581 |
| 2017/0338602 | A1 * | 11/2017 | Ho | H01R 24/60 |

* cited by examiner

*Primary Examiner* — Travis S Chambers
(74) *Attorney, Agent, or Firm* — Terrile, Cannatti & Chambers, LLP; Emmanuel A. Rivera

(57) ABSTRACT

A system and flexible mounting structure for solder joint stress reduction are disclosed that provide flexibility on a printed circuit board that includes an input output (I/O) connector when wrenching or torque forces are applied. A bracket supporting the connector is mounted on one side of the PCB, and a hinge saddle structure is mounted on the other side of the PCB. A bottom structure is connected to the hinge saddle structure by screw bosses. The bottom structure and the hinge saddle structure are connected to a chassis of an information handling system. An area of the PCB as defined by the bracket is provided flexibility when forces are applied.

20 Claims, 5 Drawing Sheets

FLEXIBLE INPUT OUTPUT MOUNTING FOR SOLDER JOINT STRESS REDUCTION

BACKGROUND OF THE INVENTION

Field of the Invention

The present invention relates to information handling systems and devices. More specifically, embodiments of the invention relate to torque forces on connectors of printed circuit boards on information handling systems.

Description of the Related Art

Connectors, such as data and power connectors are typically placed on printed circuit boards (PCB) or motherboards of information handling systems and devices, such as laptop computers. Examples of connectors can include DC (power) input connector, universal serial bus (USB) connectors covering all standards (e.g., USB C type), APPLE™ LIGHTNING, THUNDERBOLT™ connectors, etc. Such connectors are typically soldered onto the PCBs at pin solder joints.

PCB/motherboard mounted connectors provide an interface for a laptop computer user to connect an external plug or device to the laptop computer. When an external plug or device is connected to the PCB mounted connector, various torque or wrenching forces from typical usage may be applied at the pin solder joints. Such repetitive (i.e., high cycle) torque or wrenching (e.g., high) forces can result in pin solder joint failure. When such failures occur, the connector can be displaced, resulting in failure of the connector and/or failure of components around the connector.

Existing solutions may provide for structural support such as brackets to reduce solder joint stress. Such solutions may reduce connector movement, and reduce solder joint stress. However, these solutions can also increase the stiffness of the PCB at the connector. The PCB and the brackets are secured to an information handling system (e.g., laptop computer) in close proximity to the connectors. Due to the high PCB stiffness, forces transmitted from the connector to the PCB can result in high stress at the solder joint.

Other solutions can include providing for additional pegs or integrating brackets into shells. This solution adds complexity and may not resist a high force wrenching event. The use of glue or adhesives over solder joints/pins adds cost and complexity. Adding a cabled I/O to the connector adds complexity and cost by introducing a cable and other connectors. Furthermore, space is taken up by the cabled IO. Signal integrity becomes can be an issue when trying to maintain high speed I/O. A panel mounted connector may be only possible on information handling systems without space constraints.

SUMMARY OF THE INVENTION

A system and flexible mounting structure for solder joint stress reduction are disclosed that provide flexibility on a printed circuit board that includes an input output (I/O) connector when wrenching or torque forces are applied. A bracket supporting the connector is mounted on one side of the PCB, and a hinge saddle structure is mounted on the other side of the PCB. A bottom structure is connected to the hinge saddle structure by screw bosses. The bottom structure and the hinge saddle structure are connected to a chassis of an information handling system. An area of the PCB as defined by the bracket is provided flexibility when forces are applied.

BRIEF DESCRIPTION OF THE DRAWINGS

The use of the same reference number throughout the several figures designates a like or similar element. The present invention may be better understood, and its numerous objects, features, and advantages made apparent to those skilled in the art by referencing the accompanying drawings, wherein.

DETAILED DESCRIPTION

In various implementations, a system and PCB geometry allow for the PCB or motherboard to have flexibility at a connector (i.e, input output or I/O). When a force is applied to the connector, the force is transmitted through system support structures. With flexibility, the PCB or motherboard is allowed to move with the connector, reducing stress at solder joints.

Figure 1:
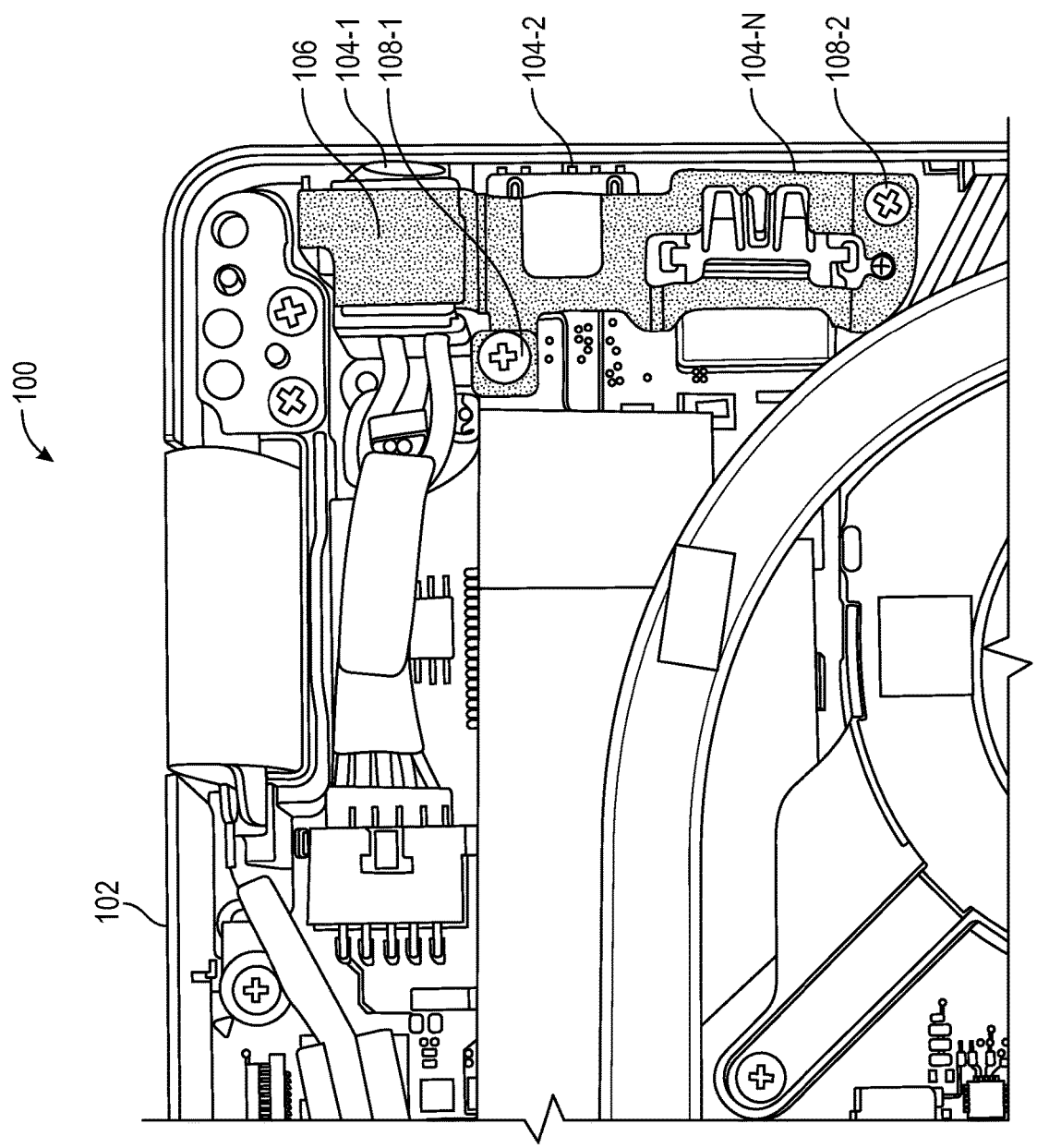
FIG. 1 depicts a bottom view perspective view of a printed circuit board (PCB) or motherboard system.

FIG. 1 illustrates a bottom view perspective view of a printed circuit board (PCB) or motherboard system. It is to be understood and will be apparent in further description, that in certain implementations, the view of the PCB/motherboard system 100 can be a top view perspective. The PCB/motherboard system 100 can be part of an information handling system, such as space constrained portable device. For example, a laptop computer.

The PCB/motherboard system 100 includes a PCB or motherboard 102, which is populated with various components and connections. In particular, the PCB or motherboard 102 can include various connectors 104-1, 104-2, to 104-N. Connectors 104 can include DC (power) input connector, universal serial bus (USB) connectors covering all standards (e.g., USB C type), APPLE™ LIGHTNING, THUNDERBOLT™ connectors, etc. Various implementations provide for the connectors 104 to be soldered (joint/pin) to the PCB or motherboard 102.

In various implementations, a bracket or brackets as represented by bracket 106 covers the connectors 104. The bracket 106 may be constructed of sheet metal or a non-conductive malleable material. The bracket 106, as further described herein, is connected to structures of the chassis of the information handling system. Implementations provide for screw bosses, such as screws bosses 108-1 and 108-2 to connect the bracket 106.

Figure 2:
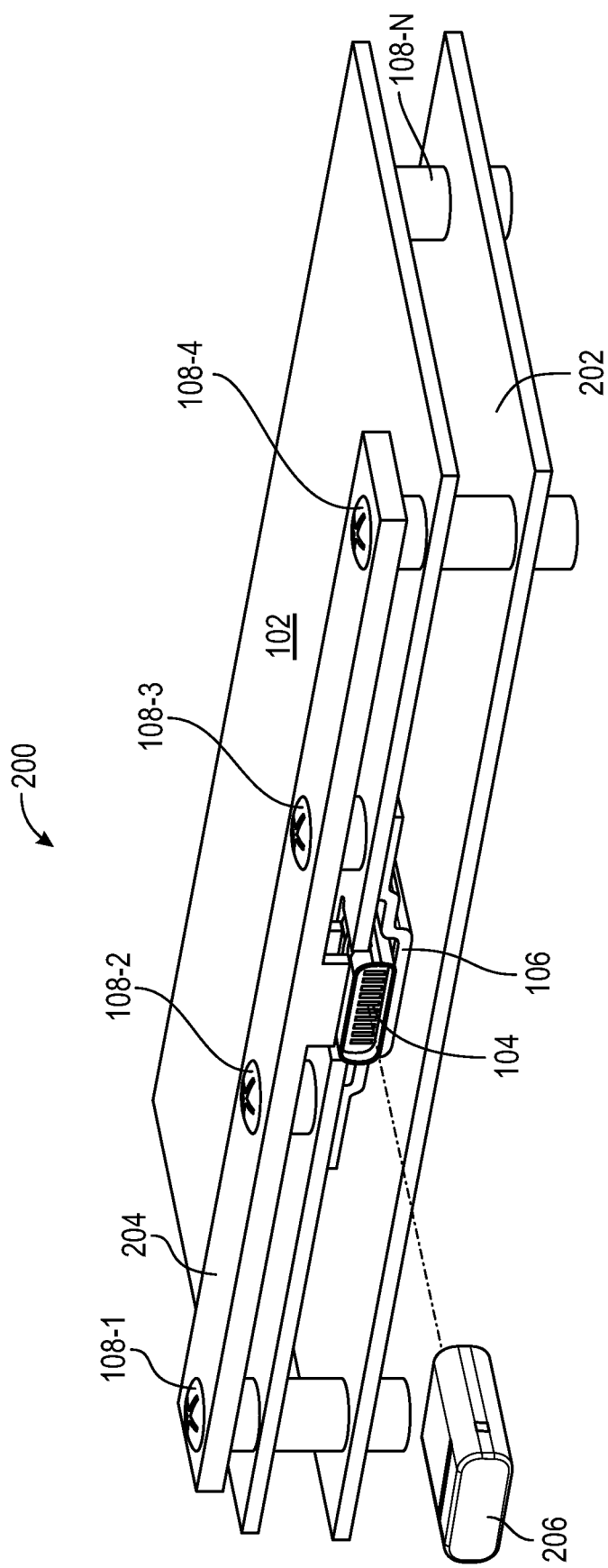
FIG. 2 depicts a front and right perspective view of a flexible mounting structure for solder joint stress reduction.

FIG. 2 illustrates a front and right perspective view of a flexible mounting structure for solder joint stress reduction. The flexible mounting structure 200 is a baseline structure of various implementations as described herein. The structure 200 is connected or attaches to a chassis (not shown) of an information handling system, such as a laptop computer.

Various implementations provide for a structure 202, that is a bottom structure, attached to the chassis. Implementations provide for a hinge saddle structure 204 to be attached to the chassis. The hinge saddle structure 204 is a chassis support on one side of the PCB or motherboard 102, while the bracket 106 is on the other side of the PCB or motherboard 102.

The screw bosses 108 connect the structures. In this example, it is shown that screw bosses 108-2 and 108-3 are connected to the bracket 106 that supports the connector or I/O 104. Devices or external devices are connected by an interface component as represented by interface component 206.

Figure 3:
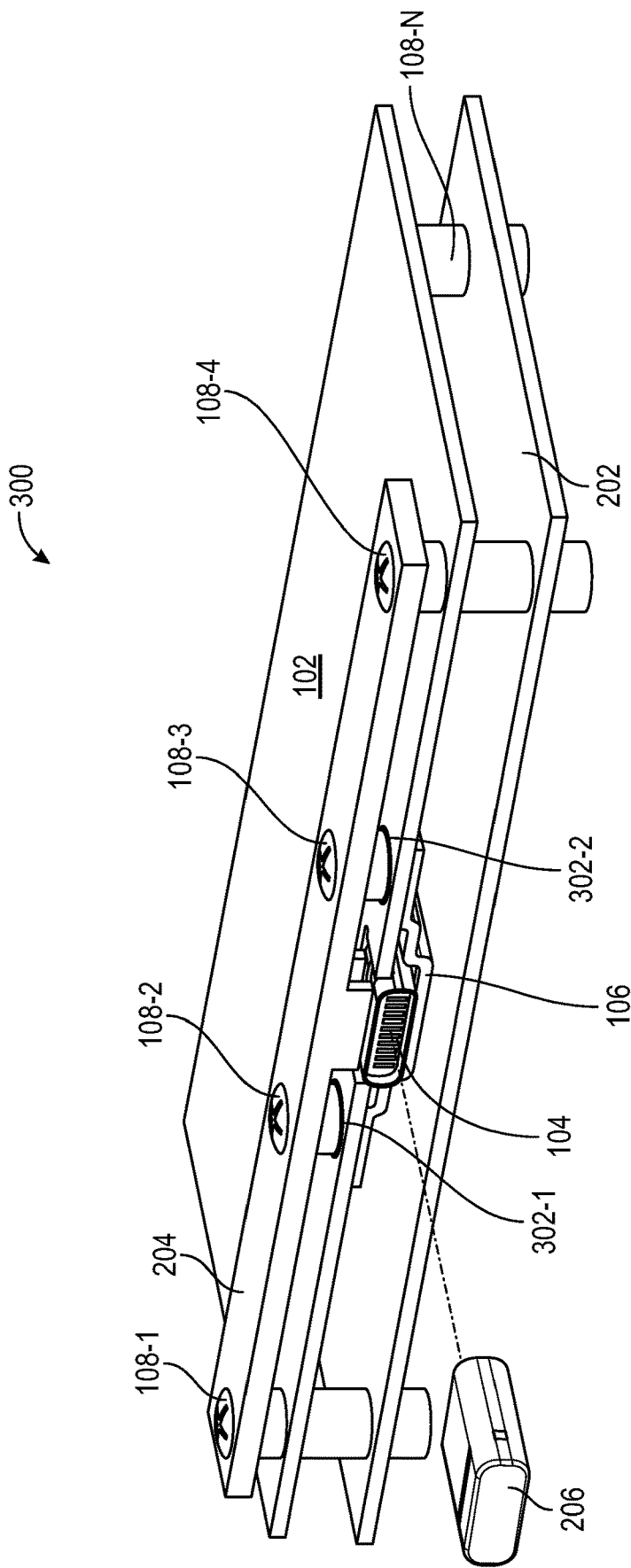
FIG. 3 depicts a front and right perspective view of a flexible mounting structure for solder joint stress reduction implementing through holes.

FIG. 3 illustrates a front and right perspective view of a flexible mounting structure for solder joint stress reduction implementing through holes. The flexible mounting structure 300 implements through holes 302-1 and 302-2 that allow the respective screw bosses 108-2 and 108-3 to pass through the PCB or motherboard 102. This allows the bracket 106 to mount or connect directly to the hinge saddle structure 204. The bracket 106 and the hinge saddle structure 204 being on opposite sides of the PCB or motherboard 102. Implementations provide maintaining a rigid support of the connector 104 while allowing mounting for the connector 104 to achieve a level of flexibility.

Figure 4:
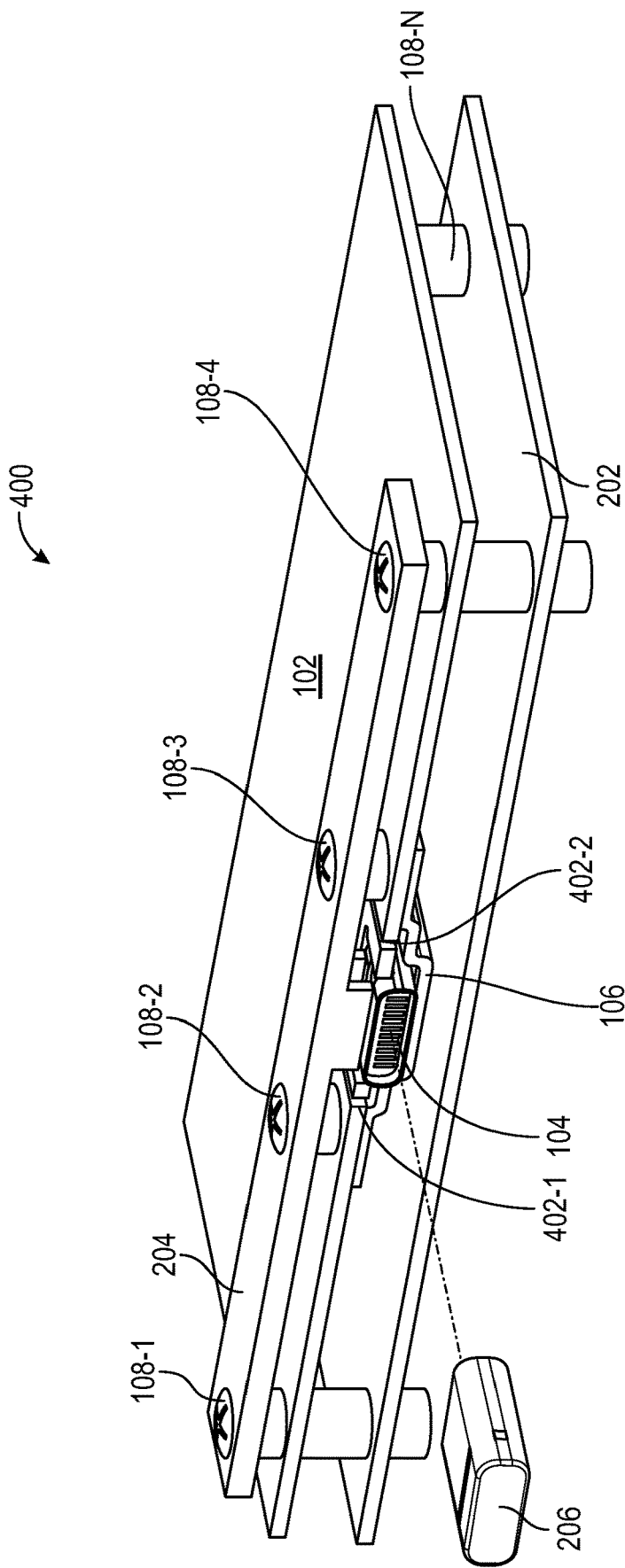
FIG. 4 depicts a front and right perspective view of a flexible mounting structure for solder joint stress reduction implementing a flexible cut out section.

FIG. 4 illustrates a front and right perspective view of a flexible mounting structure for solder joint stress reduction implementing a flexible cut out section. The flexible mounting structure 400 implements a cut out section formed by cut out grooves 402-1 and 402-2, and further described below in FIG. 5. The cut out grooves 402 are created in the PCB or motherboard 102 around the connector 104 to form a flexible region behind the connector 104. The flexible region acting as a "diving board" that flexes when forces are applied. In such embodiments, the screw bosses 108-2 and 108-3 are connected to the PCB or motherboard 102, as well as the bracket 106.

Figure 5:
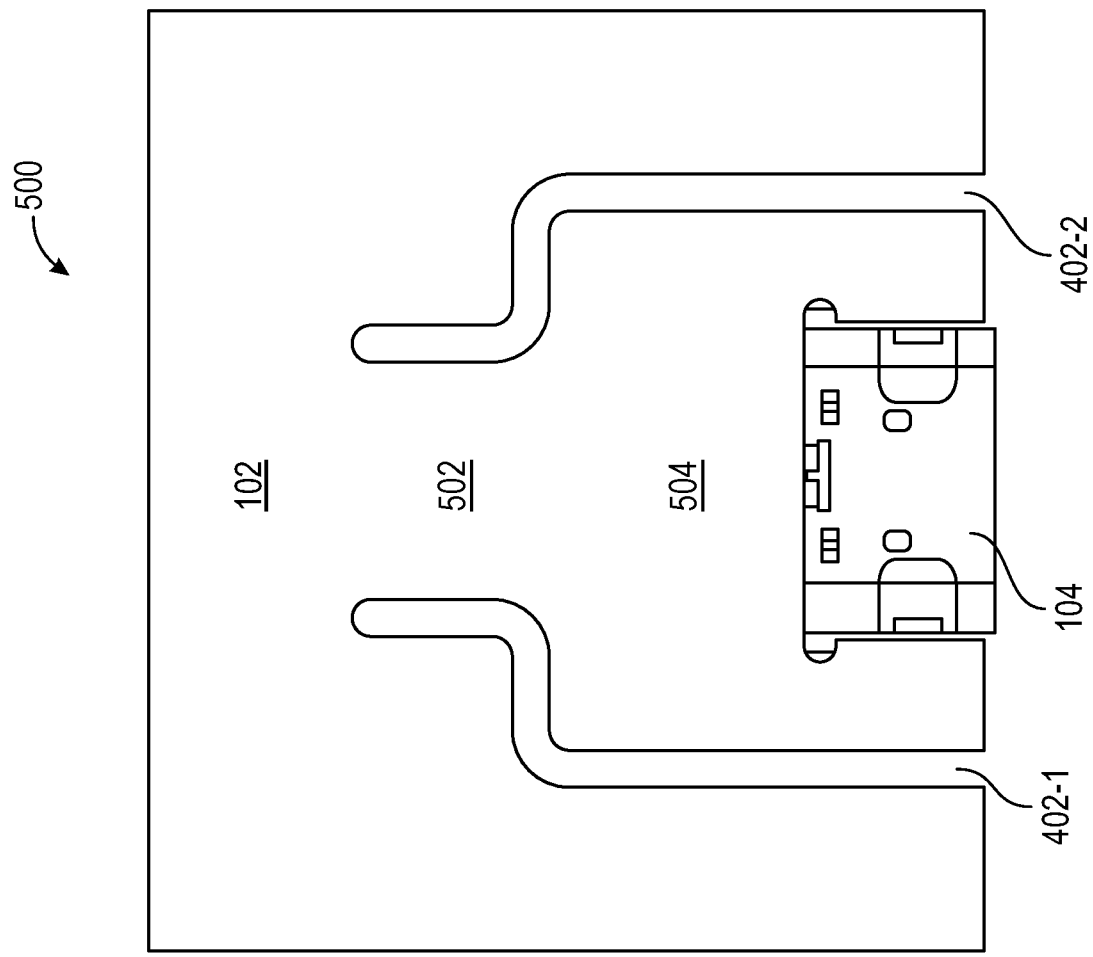
FIG. 5 depicts a top view of a flexible cut out section.

FIG. 5 illustrates a top view of a flexible cut out section. The view 500 of the flexible cut out section shows the PCB or motherboard 102, the cut out grooves 402-1 and 402-2. The connector 104 is shown solder jointed/pinned to the PCB or motherboard 102.

The flexible cut out section includes a flex zone 502 and a space for components 504 that support particular connectors. Connector 104 may have the need to have support components placed in close proximity to connector 104. For example, certain I/O, such as USB4/TBT4 on a type C connector, have the need for supporting components within close proximity to the connector 104. Such components are provided for in space 504 of the flexible cut out section. The components are populated within the space 504.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only and are not exhaustive of the scope of the invention.

Consequently, the invention is intended to be limited only by the spirit and scope of the appended claims, giving full cognizance to equivalents in all respects.

What is claimed is:

1. A flexible mounting structure for solder joint stress reduction comprising:
  a printed circuit board (PCB);
  a bracket mounted on one side of the PCB supporting a connector;
  a hinge saddle structure mounted on the other side of the PCB, wherein the hinge saddle structure is attached to a chassis of an information handling system; and
  a bottom structure attached to the chassis of the information handling system, connected to the hinge saddle structure by screw bosses, wherein an area of the PCB as defined by the bracket is provided flexibility when forces are applied.

2. The flexible mounting structure claim 1 further comprising through holes on the PCB for screw bosses that connect the hinge saddle structure to the bracket, providing the flexibility when forces are applied.

3. The flexible mounting structure claim 1, wherein the connector is one of multiple input output (I/O) types.

4. The flexible mounting structure claim 1, wherein the hinge saddle structure is attached to a structure of the chassis.

5. The flexible mounting structure claim 1, wherein the information handling system is a laptop computer.

6. The flexible mounting structure claim 1 further comprising a cut out section of the PCB to form a flexible region.

7. The flexible mounting structure claim 6, wherein the flexible region comprises a space for connector specific components and a flex zone.

8. An information handing system printed circuit board (PCB) comprising:
  an input output (I/O) connector mounted on the PCB;
  a bracket supporting the connector mounted on one side of the PCB; and
  a hinge saddle structure mounted on the other side of the PCB,
  wherein the hinge saddle structure is attached to a chassis of an information handling system,
  wherein the hinge saddle structure is connected by screw bosses to a bottom structure of the chassis, and
  wherein an area of the PCB as defined by the bracket is provided flexibility when forces are applied.

9. The PCB of claim 8 further comprising through holes on the PCB for screw bosses that connect the hinge saddle structure to the bracket, providing the flexibility when forces are applied.

10. The PCB of claim 8, wherein the connector is one of multiple input output (I/O) types.

11. The PCB claim 8, wherein the wherein the hinge saddle structure is attached to a structure of the chassis.

12. The PCB of claim 8, wherein the information handling system is a laptop computer.

13. The PCB of claim 8 further comprising a cut out section of the PCB to form a flexible region.

14. The PCB of claim 13, wherein the flexible region comprises a space for connector specific components and a flex zone.

15. An information handling system chassis comprising:
  a hinge saddle structure attached to the chassis, wherein the hinge saddle is mounted on one side of a printed circuit board (PCB) and a bracket supporting a connector is attached on the other side of the PCB; and
  a bottom structure attached to the chassis, connected to the hinge saddle structure by screw bosses, wherein an area of the PCB as defined by the bracket is provided flexibility when forces are applied.

16. The chassis of claim 15 further comprising through holes on the PCB for screw bosses that connect the hinge saddle structure to the bracket, providing the flexibility when forces are applied.

17. The chassis of claim 15, wherein the connector is one of multiple input output (I/O) types.

18. The chassis of claim 15, wherein the information handling system is a laptop computer.

19. The chassis of claim 15, wherein the PCB comprises a cut out section that forms a flexible region.

20. The chassis of claim 19, wherein the flexible region comprises a space for connector specific components and a flex zone.

* * * * *